(12) United States Patent
Liu et al.

(10) Patent No.: US 12,174,990 B2
(45) Date of Patent: Dec. 24, 2024

(54) BATCH PRIVACY INFORMATION RETRIEVAL METHOD AND APPARATUS

(71) Applicant: ZHEJIANG UNIVERSITY, Zhejiang (CN)

(72) Inventors: Jian Liu, Hangzhou (CN); Jingyu Li, Hangzhou (CN); Di Wu, Hangzhou (CN); Kui Ren, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/632,273

(22) Filed: Apr. 10, 2024

(65) Prior Publication Data

US 2024/0394402 A1 Nov. 28, 2024

Related U.S. Application Data

(63) Continuation of application No. PCT/CN2023/095566, filed on May 22, 2023.

(51) Int. Cl.
*G06F 21/62* (2013.01)
*G06F 9/38* (2018.01)
*G06F 21/60* (2013.01)

(52) U.S. Cl.
CPC ........ *G06F 21/6227* (2013.01); *G06F 9/3887* (2013.01); *G06F 21/602* (2013.01)

(58) Field of Classification Search
CPC ... G06F 21/6227; G06F 9/3887; G06F 21/602
See application file for complete search history.

(56) References Cited

U.S. PATENT DOCUMENTS

| 10,853,422 | B2* | 12/2020 | Laine | G06F 16/2453 |
| 2019/0026491 | A1* | 1/2019 | Telford | G06F 21/6227 |
| 2023/0370245 | A1* | 11/2023 | Cebere | H04L 9/3213 |

FOREIGN PATENT DOCUMENTS

| CN | 113343305 A | * | 9/2021 | ............. G06F 16/22 |
| CN | 114661680 A | * | 6/2022 | ........... G06F 16/172 |
| CN | 115529118 A | * | 12/2022 | ............... H04L 9/00 |

OTHER PUBLICATIONS

CN113343305A (English Translation) (Year: 2021).*

(Continued)

*Primary Examiner* — Jung W Kim
*Assistant Examiner* — Alan L Kong
(74) *Attorney, Agent, or Firm* — W&G Law Group

(57) ABSTRACT

A batch private information retrieval method and apparatus, including: agreeing on a hash function, calculating a serial number index in an original database, retaining a result of each serial number index for each hash function, and obtaining a first hash bucket; filling an index of a batch query into a second hash bucket of a same length as the first hash bucket by the client, and encoding a filling result by using a constant weight code encoding manner; encrypting an obtained encoding result as a batch query request by the client; comparing the batch query request with the first hash bucket by the server to obtain a corresponding intermediate result, calculating correspondingly the intermediate result and the original database to obtain a corresponding query result ciphertext; and decrypting the query result ciphertext by the client, and thus simultaneously obtaining a query result of the batch query request.

10 Claims, 7 Drawing Sheets

(56) References Cited

OTHER PUBLICATIONS

CN114661680A (English Translation) (Year: 2022).*
CN115529118A (English Translation) (Year: 2022).*
International Search Report (PCT/CN2023/095566); Date of Mailing: Dec. 25, 2023.

* cited by examiner

BATCH PRIVACY INFORMATION RETRIEVAL METHOD AND APPARATUS

CROSS-REFERENCE TO RELATED APPLICATIONS

The present application is a continuation of International Application No. PCT/CN2023/095566, filed on May 22, 2023, the content of which is incorporated herein by reference in its entirety.

TECHNICAL FIELD

The present disclosure belongs to the field of cryptography applications, and in particular, to a batch privacy information retrieval method and apparatus.

BACKGROUND

The rapid development of Internet technology has made cloud services mainstream. Large service providers utilize databases hosted on cloud servers to provide services to clients, which obtain information by accessing servers in the cloud. However, this efficient service model has a risk of privacy leakage, as the servers can know the specific content that user sides want to access, which is unacceptable in many privacy-sensitive scenarios, such as medical databases. An information retrieval method based on privacy protection can avoid this security problem.

A traditional information retrieval method based on privacy protection can only process one query at a time, and when a user has a plurality of requests at the same time, no higher efficiency can be achieved by using a repeated-run word private information retrieval method, which contains a large number of redundant steps. A batch private information retrieval protocol has much smaller equalized computational overhead than the word privacy information query method. However, although previous batch private information retrieval methods, such as SealPIR proposed by Hao Chen et al., combine a cuckoo hash technique with batch queries for the first time, while the equalized computational overhead is reduced, additional communication overhead needs to be introduced due to the use of common encoding properties. R A Mahdavi et al. first proposes the application of constant weight code encoding to a private information retrieval scheme, but they do not consider a batch retrieval scenario, and their implementation scheme does not take full advantage of the properties of homomorphic encryption, and cannot be applied to actual scenarios due to the computational efficiency thereof.

SUMMARY

An object of embodiments of the present disclosure is to provide a batch private information retrieval method and apparatus to solve the technical problems of high computational and communication overhead and low practicability existing in the related art. The method and apparatus combine a constant weight code technique and a cuckoo hash technique, perform optimization for homomorphic encryption computational properties, can reduce communication equalized overhead and computation equalized overhead at the same time, have a better performance, and can be better applied to actual scenarios.

According to a first aspect of embodiments of the present disclosure, a batch private information retrieval method is provided, including the following step of:

Agreeing, by a client and a server, on a hash function used in a cuckoo hash technique, calculating, by the cuckoo hash technique, a serial number index in an original database, retaining a result of each serial number index for each hash function, and obtaining a first hash bucket including several baskets. The result of the serial number index in the first hash bucket is public to both the server and the client.

Filling, by the client, an index of a batch query into a second hash bucket of a same length as the first hash bucket through a cuckoo hash algorithm, where a sequence index of the index of the batch query in the corresponding basket of the first hash bucket is filled at a corresponding position, and encoding a filling result by using a constant weight code encoding manner.

Encrypting, by the client, an obtained encoding result by using a homomorphic encryption technique as a batch query request, and sending the batch query request to the server.

Comparing, by the server, the received batch query request with the first hash bucket by using the homomorphic encryption technique to obtain a corresponding intermediate result.

Calculating correspondingly, by the server, the intermediate result and the original database to obtain a query result ciphertext corresponding to the batch query request, and sending the query result ciphertext to the client.

Decrypting, by the client, the query result ciphertext, and thus simultaneously obtaining a query result of the batch query request.

Further, the step of encoding a filling result by using a constant weight code encoding manner is specifically: selecting a length n of a largest basket in the first hash bucket as an encoding domain of a constant weight code, where a length corresponding to the constant weight code is m, selecting a number k of 1 in the constant weight code, and mapping the filling result into the constant weight code.

Further, encrypting, by the client, the obtained encoding result by using a Single Instruction Multiple Data SIMD technique of homomorphic encryption.

Further, a process that encrypting, by the client, the obtained encoding result by using a Single Instruction Multiple Data SIMD technique of homomorphic encryption comprises is specifically: for a hash bucket of a length B, encrypting B corresponding first bits in the hash bucket into a same ciphertext, encrypting a second bit into a second ciphertext, and so on. If a corresponding position corresponding to the hash bucket is empty, all bits of the constant weight code are 0 by default.

Further, the step of comparing, by the server, the received batch query request with the first hash bucket by using the homomorphic encryption technique to obtain a corresponding intermediate result includes:

Performing corresponding constant weight code encoding on each sequence index in each basket of the first hash bucket.

Selecting, for each sequence index, a ciphertext corresponding to a bit 1 in a current constant weight code, and calculating a product of all selected ciphertexts by using a SIMD technique of homomorphic encryption to obtain the corresponding intermediate result.

Further, the step of calculating correspondingly, by the server, the intermediate result and the original database to obtain a query result ciphertext corresponding to the batch query request includes:

Multiplying the intermediate result by a corresponding position of the original database to obtain a ciphertext in the corresponding position of the original database.

Adding all results in each basket to form the query result ciphertext.

Further, when a length of content at the corresponding position of the original database exceeds a plaintext domain of the SIMD technique, slicing the content and querying the sliced content, respectively, to form several query result ciphertexts, and sending the query result ciphertexts to the client, respectively.

According to a second aspect of embodiments of the present disclosure, a batch private information retrieval apparatus is provided, including:

A cuckoo hash module configured to agree on a hash function used in a cuckoo hash technique by a client and a server, calculate a serial number index in an original database through the cuckoo hash technique, retain a result of each serial number index for each hash function, and obtain a first hash bucket including several baskets, where the result of the serial number index in the first hash bucket is public to both the server and the client.

An encoding module configured to fill an index of a batch query into a second hash bucket of a same length as the first hash bucket through a cuckoo hash algorithm by the client, where a sequence index of the index of the batch query in the corresponding basket of the first hash bucket is filled at a corresponding position, and to encode a filling result by using a constant weight code encoding manner.

An encryption module configured to encrypt an obtained encoding result by using a homomorphic encryption technique as a batch query request by the client, and send the batch query request to the server.

A comparison module configured to compare the received batch query request with the first hash bucket by using the homomorphic encryption technique by the server to obtain a corresponding intermediate result.

A calculation module configured to calculate correspondingly the intermediate result and the original database by the server to obtain a query result ciphertext corresponding to the batch query request, and send the query result ciphertext to the client.

A decryption module configured to decrypt the query result ciphertext by the client, and thus simultaneously obtain a query result of the batch query request.

According to a third aspect of embodiments of the present disclosure, an electronic device is provided, including:

One or more processors; and

A memory, configured to store one or more programs.

When the one or more programs are executed by the one or more processors, the one or more processors implement the method as described in the first aspect.

According to a fourth aspect of embodiments of the present disclosure, a computer-readable storage medium is provided, on which a computer instruction is stored, and the computer instruction, when executed by a processor, is configured to implement steps of the method as described in the first aspect.

A technical scheme provided by embodiments of the present disclosure may include the following beneficial effects:

As can be seen from the above embodiments, the present disclosure, by re-designing the specific query scheme for batch private information retrieval, combining the cuckoo hash technique, the constant weight code encoding technique and the SIMD technique under homomorphic encryption, and designing and optimizing a query algorithm by utilizing advantages of the different techniques combined with specific scenarios, greatly reduces the computational overhead, reduces query time required for batch private information retrieval, and enables the query scheme to be more suitable for actual scenarios. At the same time, compared with similar schemes, the batch private information retrieval under this scheme can greatly reduce the communication overhead and significantly reduce a size of an uploaded request ciphertext. In an embodiment, for a database with one million pieces ($2^{20}$ pieces) of data (a length of each piece of data is set to be 256 bytes), when two thousand queries are completed in batch, equalized time required for each query is 3.9 milliseconds, which reduces a communication volume in an upload part by about 75 times compared with a previous batch query. This scheme can implement a batch information retrieval service under privacy protection, and the communication overhead and computational overhead are much lower than previous solutions.

It should be understood above general descriptions and later detailed descriptions are only exemplary and illustrative, and cannot limit the present disclosure.

BRIEF DESCRIPTION OF DRAWINGS

The accompanying drawings here are incorporated into the specification, constitute a part of the specification, illustrate embodiments consistent with the present disclosure, and are used to explain a principle of the present disclosure together with the specification.

DESCRIPTION OF EMBODIMENTS

Exemplary embodiments will be illustrated in detail here, and examples thereof are shown in the accompanying drawings. When the following description refers to the accompanying drawings, unless otherwise indicated, the same numbers in different drawings indicate the same or similar elements. Implementations described in the following exemplary embodiments do not represent all implementations consistent with the present disclosure.

Terms used in the present disclosure are only for the purpose of describing specific embodiments, and not intended to limit the present disclosure. Singular forms "one", "said" and "the" used in the present disclosure and the appended claims are further intended to include plural forms unless the context clearly indicates other meanings. It should further be understood that a term "and/or" as used herein refers to and includes any or all possible combinations of one or more associated listed items.

It should be understood that although terms first, second, third, etc. may be used for describing various information in the present disclosure, such information should not be limited to these terms. These terms are only used for distinguishing the same type of information from each other. For example, without departing from the scope of the present disclosure, first information may further be referred to as second information, and similarly, the second information may further be referred to as the first information. Depending on the context, for example, a word "if" as used herein may be interpreted as "at the time" or "when" or "in response to determining".

Figure 1:
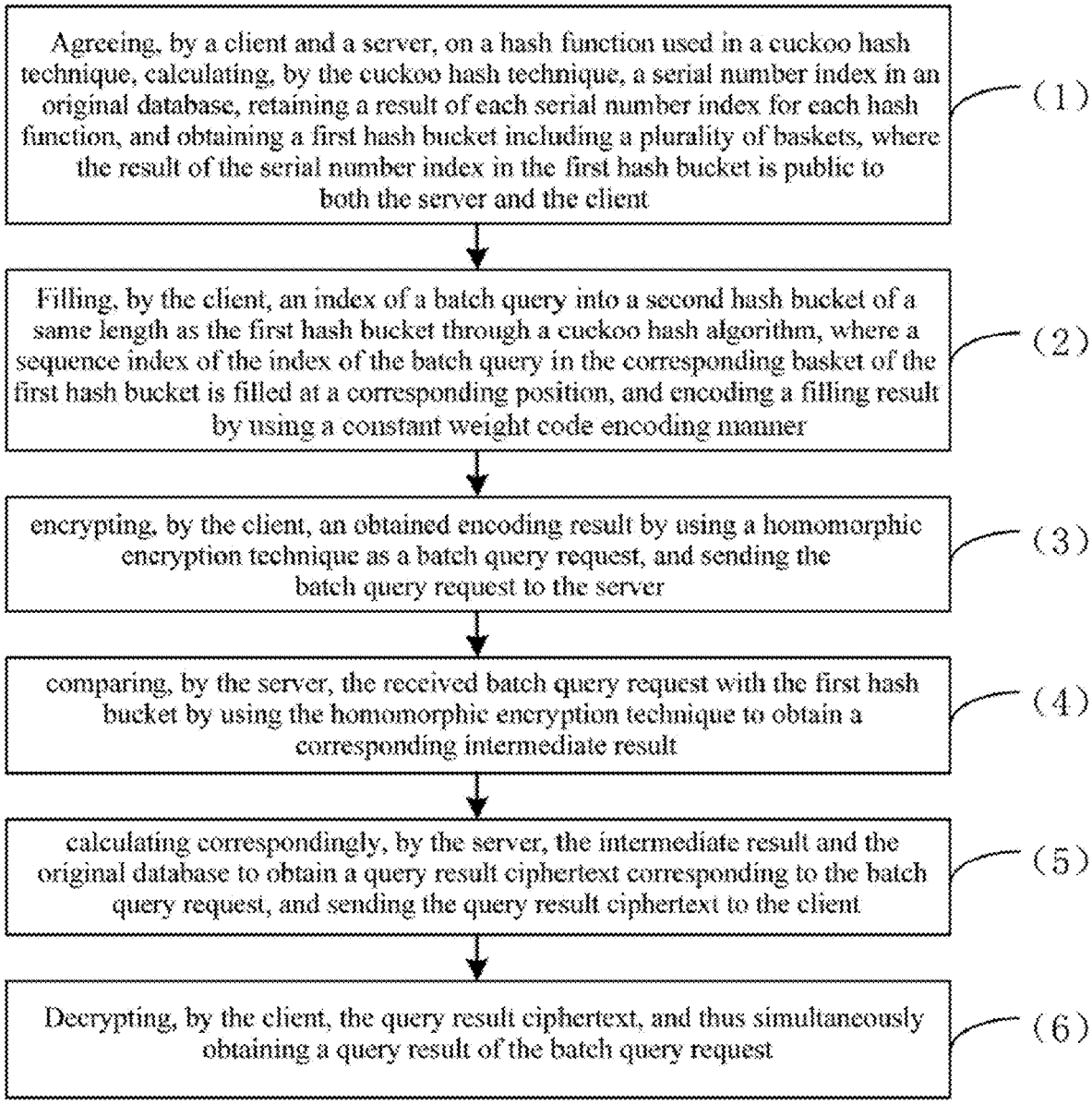
FIG. 1 is a flowchart of a batch private information retrieval method illustrated according to an exemplary embodiment.

FIG. 1 is a flowchart of a batch private information retrieval method illustrated according to an exemplary embodiment. As shown in FIG. 1, the method is applied to a terminal and may include the following steps:

(1) A hash function used in a cuckoo hash technique is agreed by a client and a server, a serial number index in an original database is calculated through the cuckoo hash technique, a result of each serial number index for each hash function is retained, and a first hash bucket containing a plurality of baskets is obtained, where the result of the serial number index in the first hash bucket is public to both the server and the client.

(2) An index of a batch query is filled into a second hash bucket of a same length as the first hash bucket through a cuckoo hash algorithm by the client, where a sequence index of the index of the batch query in the corresponding basket of the first hash bucket is filled at a corresponding position, and a filling result is encoded by using a constant weight code encoding manner.

(3) An obtained encoding result is encrypted by using a homomorphic encryption technique as a batch query request by the client, and the batch query request is sent to the server.

(4) The received batch query request is compared with the first hash bucket by using the homomorphic encryption technique by the server to obtain a corresponding intermediate result.

(5) The intermediate result and the original database are calculated correspondingly by the server, and a query result ciphertext corresponding to the batch query request is obtained and sent to the client.

(6) The query result ciphertext is decrypted by the client, and thus a query result of the batch query request is obtained simultaneously.

In a specific implementation, the present disclosure may be applied to scenarios such as a medical database, where a visitor (client) expects to query a detailed description of a certain series of medicines such as corresponding treatment symptoms, contraindications, instructions for use, inventory, etc., and at the same time, does not want an owner (server) of the medical database to know which series of medicines the visitor is interested in. If the server knows a list of medicines that a current querying user is interested in, it may be inferred that the client may be suffering from some kind of disease, such as hepatitis B, etc. The user's own physical condition is sensitive and private information that is not expected to be exposed to the server, an inadvertent leakage may lead to unnecessary troubles, and the possibility of the leakage of the sensitive information may further make some patients worry about the risk of leakage so as to give up a query function and miss part of effective treatment information. In addition, this protocol can further be applied to basic modules in other privacy calculating protocols, such as an offline acceleration part for a single privacy query or a batch table lookup operation in privacy machine learning, etc. Description will be made below in conjunction with a medicine information query.

Figure 2:
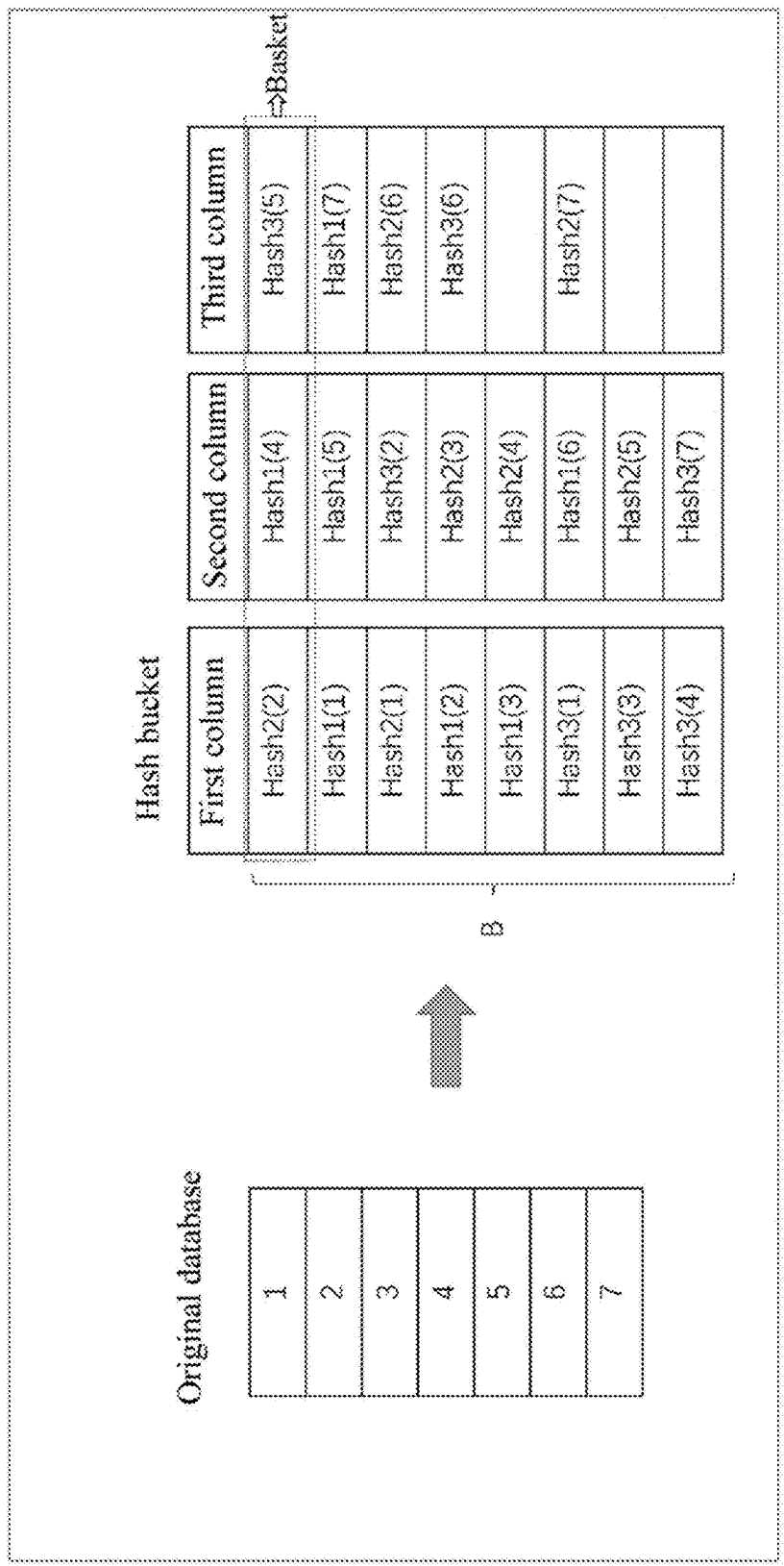
FIG. 2 is a schematic diagram of retaining hash function results based on all serial numbers illustrated according to an exemplary embodiment.

(1) The hash function used in the cuckoo hash technique is agreed by the client and the server, the serial number index in the original database is calculated through the cuckoo hash technique, a result of each serial number index for each hash function is retained, and a first hash bucket containing a plurality of baskets is obtained, where the result of the serial number index in the first hash bucket is public to both the server and the client, as exemplified in FIG. 2.

The serial number index in the original database is public to both the server and the client, and an element corresponding to the serial number index is saved on the server but not kept by the client. A query of the client is to access the corresponding elements through the serial number index with the help of server. In a specific implementation, the server has a medical database. Taking a medicine database as an example, the database contains a detailed description of medicines such as treatment symptoms, contraindications, instructions for use, inventory, etc. The client wants to know specific information of a series of medicines, but do not want to reveal that he is interested in this series of medicines, because such information will indirectly leak the client's physical condition. The client may query the database through a number of a required medicine to know the detailed description of the medicine, and it supports querying a plurality of medicines at the same time. After the query, the server cannot determine which medicine information the client cares about, and thus cannot infer the user's physical condition and other valid information based on the query, and the client does not have to worry about the leakage of personal physical condition information during the query process when the client carries out the query for drugs for some sensitive types of diseases. The cuckoo hash technique includes a plurality of different hash functions, the cuckoo hash technique used here as well as the specific hash functions are public to both the server and the client, and the number of the hash functions is usually chosen to be 3 in the present method.

In an embodiment, for each serial number index, results of three hash functions are calculated and retained in sequence. The results of the calculation are equally divided in the first hash bucket of a size B using the cuckoo hash algorithm. The first hash bucket includes a plurality of baskets. A position of each serial number index in each basket in the medicine database is public to both the server and the client.

Each position in the hash bucket will be filled with a plurality of serial number indexes after operation of the hash functions. It is assumed that the number of the hash bucket is B, and that the size of the hash bucket is equivalent to that after the original database is replicated three times, and the cuckoo hash algorithm is utilized to equally divide the replicated database in B positions. Therefore, in step (2), the client can query within each basket during a query, and at the moment, the size of each basket is much smaller than that before division, which is very friendly for a private information retrieval process. In addition, the results after running all the hash functions are public to both the server and the client, i.e., the client can know the position of each element in each basket.

(2) An index of a batch query is filled into a second hash bucket of a same length as the first hash bucket through the cuckoo hash algorithm by the client, where a sequence index of the index of the batch query and in the corresponding basket of the first hash bucket is filled at a corresponding position, and a filling result is encoded by using a constant weight code encoding manner.

In an embodiment, the index of the batch query in this embodiment is the number of the required medicine, the purpose of this step is to fill the second hash bucket with all the serial number indexes. The length of the second hash bucket is B, then the cuckoo hash algorithm is utilized, B positions may be filled with L desired query requests by using the algorithm under a certain failure rate, and a failure rate is (1e-40) when B=1.5 L is satisfied, which may be ignored. Therefore, the present disclosure preferably predetermines the number L of each batch query in a specific implementation, thereby determining the length of the hash bucket, and thus carries out specific processes of steps (1) to (6). Due to properties of the cuckoo hash algorithm, the position in the second hash bucket which is filled with each index must be results of the cuckoo hash functions, that is, the index will certainly appear in the basket of the corresponding position corresponding to the first hash bucket, and at the moment, only a column index in the basket needs to be used for selecting an element in the basket.

It should be noted that since the results obtained in step (1) are public to both parties and the results of all hash functions are retained, it is equivalent to re-dividing the database in B baskets after repeating it 3 times. The client runs the ordinary cuckoo hash algorithm for the indexes, that is, only one of the hash results will be retained for each index, when a hash conflict problem is encountered, a conflict resolution strategy will be used for re-computing a hash value of a conflict result, and each index will only appear once in the hash bucket after operation of the cuckoo hash algorithm. After the client fills the second hash bucket of the length B with all the indexes that need to be queried, which is equivalent to fetching a data in each basket, the size of each basket is much smaller than the size of the original database, cuckoo hash will be utilized to map each serial number that needs to be queried to the corresponding position, i.e., to obtain the basket where the element is located, and the corresponding serial number index is replaced with the corresponding index of the basket where it is located that needs to be queried.

In an embodiment, a length n of the largest basket in the first hash bucket is selected as an encoding domain of the constant weight code, a length of the corresponding constant weight code is m, and the number of 1 in the constant weight code is selected as k. Typically, the present method recommends that a balance between a computation amount and a communication amount may be obtained when k is 2, and each of the specific indexes in the basket obtained by (2.2) is encoded by using the constant weight code. A following pseudo-code provides a stable mapping from an ordinary serial number to a constant weight code, and the length m of the constant weight code satisfies m≤0 ($^k\sqrt{k!n}$+k), which is much smaller than an ordinary natural number serial number encoding mode:

```
input : i ∈ [n], m, k, ∈ ℕ with (m/k) ≥ n
output : x ∈ CW (m, k)
 1:   j := i
 2:   l := k
 3:   x := 0^m
 4:   for m' := m − 1,..., 0 do
 5:      if j ≥ (m'/l) then
 6:         x[m'] := 1
 7:         j := j − (m'/l)
 8:         l := l − 1
 9:      end if
10:      if l = 0 then
11:         break
12:      end it
13:   end for
14: return x
```

An input to this algorithm is a serial number index i, which is an integer within a range of 1−n, the length m of the constant weight code is inputted, and the number of 1 in the constant weight code is determined. An encoding result of the constant weight code is outputted. An initialized variable j is equal to i, a variable l is k, a loop is used for operating on each bit of the m-bit constant weight code, m' is a current computation bit, when the result of j is greater than or equal to $$\binom{m'}{l},$$

then the current computation bit in the outputted constant weight code is made to be a 1, at the same time, the value of l is reduced to indicate that there are still l 1s yet to appear, and the loop is quit when l is 0 to indicate that there is no longer 1 appearing in remaining positions of the constant weight code.

Figure 3:
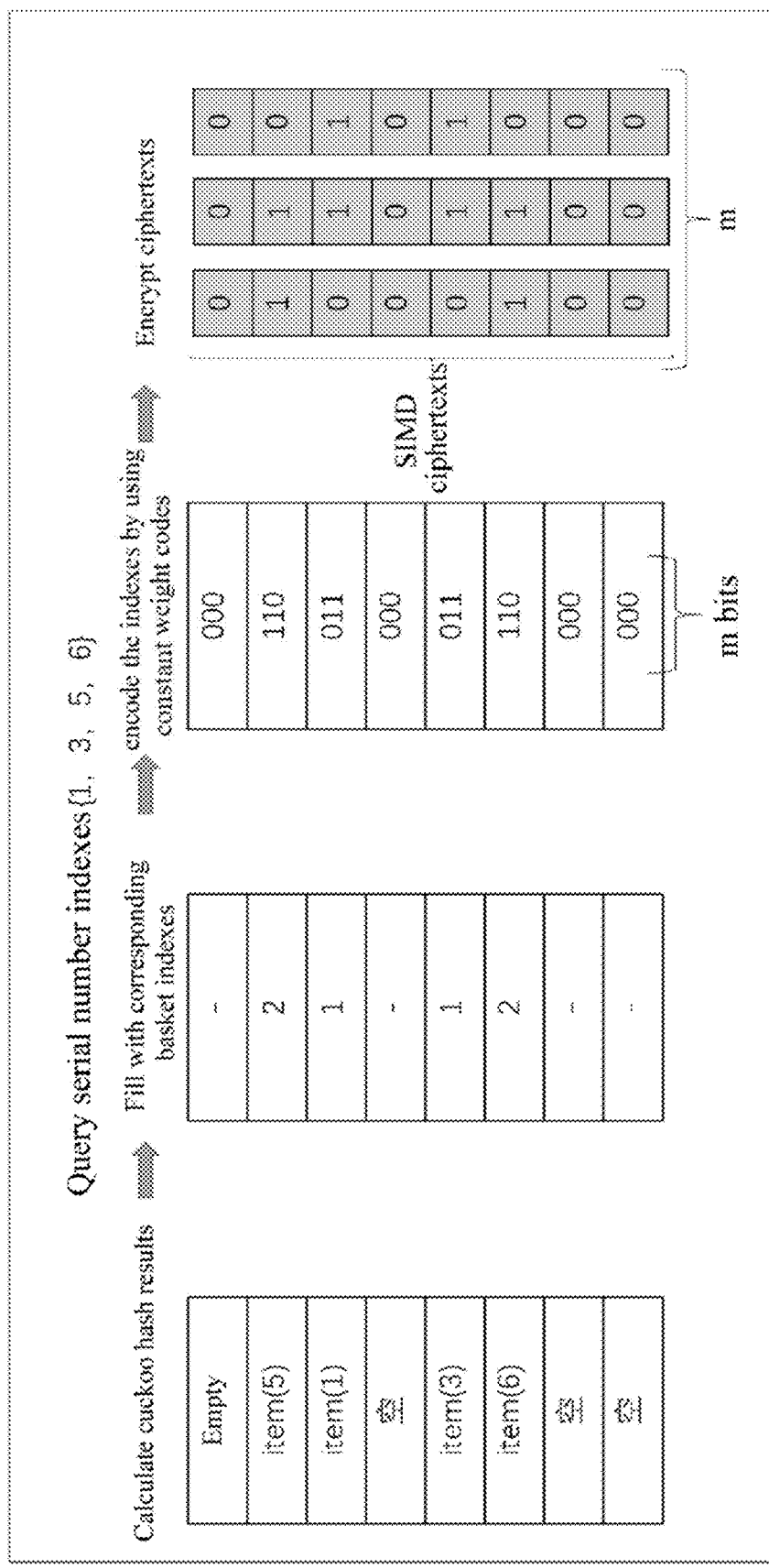
FIG. 3 is a schematic diagram of an encryption process for a client issuing a request illustrated according to an exemplary embodiment.

It should be noted that a method of mapping serial numbers to constant weight codes may be randomly defined, as long as the server and client implement agreeing the same kind of mapping. In another embodiment, as shown in FIG. 3, random mapping is taken to implement mapping of the serial numbers to the constant weight codes, and other steps of this method are not affected when the client and the server use same mapping from the ordinary serial numbers to the constant weight codes. In practice, n is much larger than k, and a length of constant weight code encoding is smaller than that of ordinary serial number encoding.

(3) An obtained encoding result is encrypted by using a homomorphic encryption technique as a batch query request by the client, and the batch query request is sent to the server.

The result of the constant weight code is encrypted by using a single instruction multiple data (SIMD) technique in homomorphic encryption, and a specific encryption method is that: B corresponding first bits in the hash bucket are encrypted into a same ciphertext, a second bit is encrypted into a second ciphertext, and so on, and if a corresponding position in the corresponding hash bucket is empty, all bits of the constant weight code are 0 by default. For the SIMD technique, it supports encrypting corresponding bits of N constant weight codes in the hash bucket into the same ciphertext at a time, where N depends on the polynomial number of homomorphic encryption choices, which is public to both the server and the client. For ease of representation, N=B is chosen in the drawing, and an example is shown in FIG. 3. In practical application scenarios, N typically takes a value of 4096, 8192, or 16384.

Encryption is performed by using a symmetric encryption algorithm in homomorphic encryption, which is able to reduce a size of a ciphertext relative to public key encryption, and all encrypted results are sent to the server, with the number of ciphertexts being m*B/N.

Figure 4:
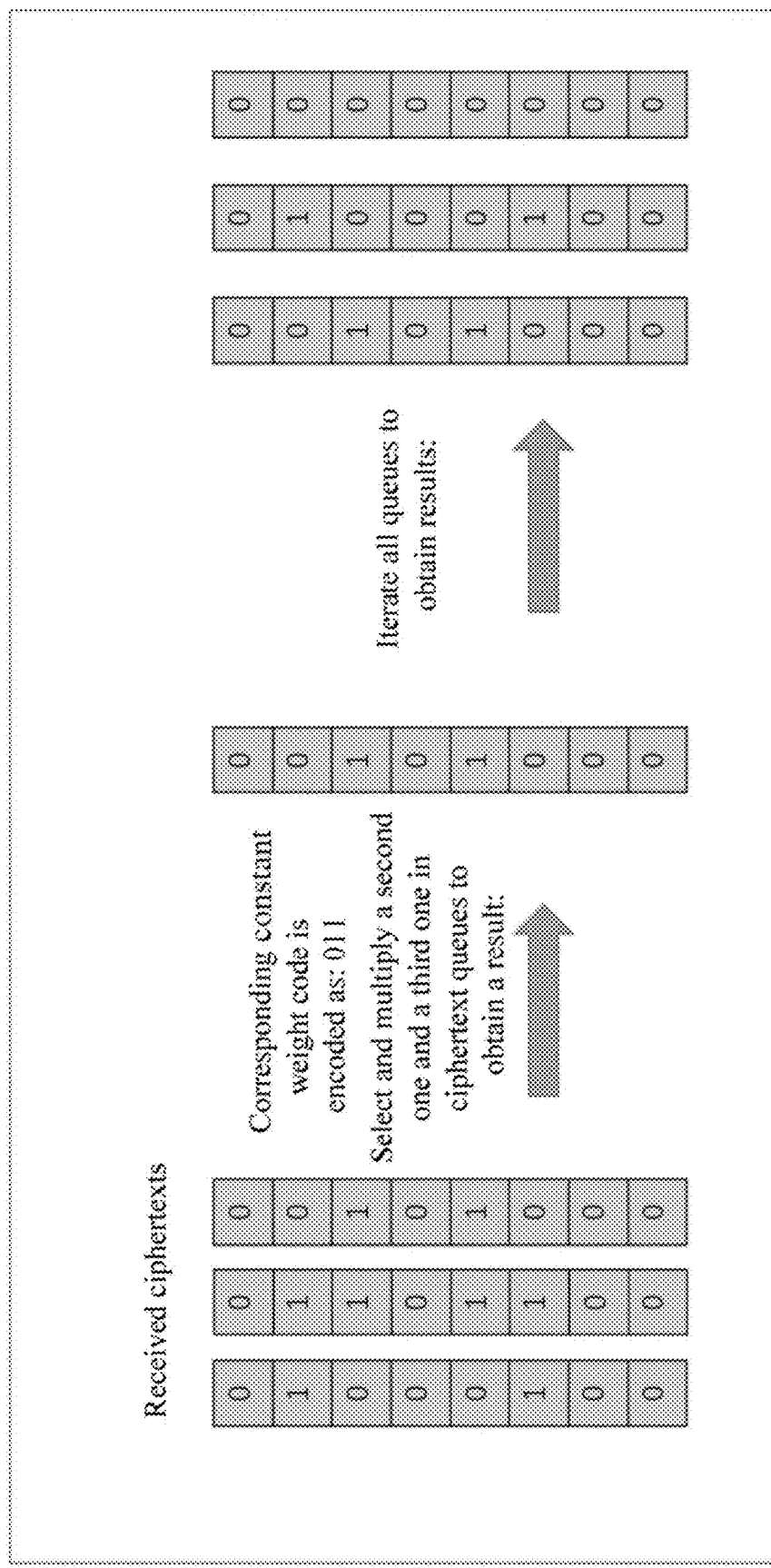
FIG. 4 is a schematic diagram of an algorithm for traversing a serial number index hour pointer in a basket for each index illustrated according to an exemplary embodiment.

(4) The received batch query request is compared with the first hash bucket by using the homomorphic encryption technique by the server to obtain a corresponding intermediate result. As shown in FIG. 4, the following process may be included.

(4.1) Corresponding constant weight code encoding is performed on each sequence index in each basket of the first hash bucket.

In an embodiment, the same constant weight code mapping method as in step (2) is used, and the server and the client agree in advance to use the same homomorphic encryption algorithm.

(4.2) A ciphertext corresponding to a bit 1 in a current constant weight code is selected for each sequence index, and a product of all selected ciphertexts is calculated by using a SIMD technique of homomorphic encryption to obtain the corresponding intermediate result, where a homomorphic encryption algorithm supports a ciphertext multiplication operation, and the SIMD technique may perform the same computational operation on N baskets simultaneously.

After (4.2), if the currently processed constant weight code is equal to the constant weight code of the serial number index taken in the corresponding basket, a corresponding position of a product result is an encrypted 1. Otherwise, it is 0. All the constant weight code are iterated, and all product results are stored.

Figure 5:
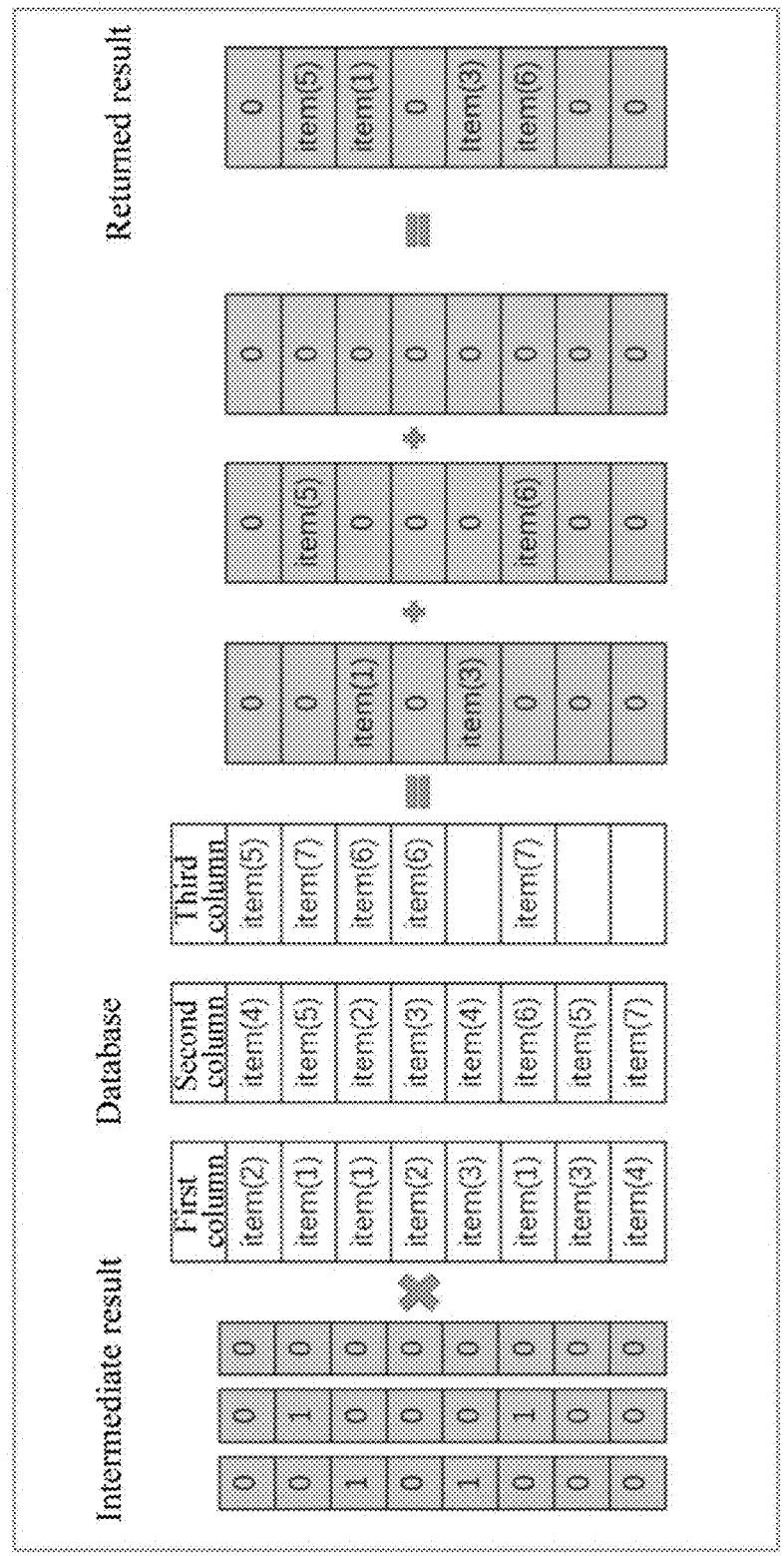
FIG. 5 is a schematic diagram of an algorithm for returning database content by using intermediate results illustrated according to an exemplary embodiment.

(5) The intermediate result and the original database are calculated correspondingly by the server to obtain a query result ciphertext corresponding to the batch query request and the query result ciphertext is sent to the client, as shown in FIG. 5.

(5.1) The intermediate result is multiplied by a corresponding position of the original database to obtain a ciphertext in the corresponding position of the original database.

(5.2) Results of all columns in each basket are added to form the query result ciphertext to reduce a return communication volume. Since after the operation of 4.3, there is at most one encrypted position of 1 in each basket, adding up the positions in each basket will not affect obtaining content of a corresponding database request position in 5.1.

In a specific implementation, when a length of database content exceeds a plaintext domain of the SIMD technique, the database content is sliced, queried respectively, and returned, where the results obtained in step 4 may be reused.

If there is a higher requirement for the communication volume, for example when a database information length is large, the communication and computational overhead may be further reduced by reshaping the database and requesting explicit packing combined with a rotary operation to recombine returned results. When B is less than N, then the results still have compression space, which is specifically expressed as:

The n elements in each basket in (2) may be split into N/B blocks and spliced vertically, and the database is reshaped into N baskets, each with a maximum length of n*B/N. At the moment, the corresponding encoding length m is reduced accordingly, further reducing the amount of computation in the computation process. The results of the N/B baskets in the returned ciphertext come from the same original basket, i.e., a plaintext corresponding to only one ciphertext is valid information, and the rest are all 0. At the moment, if a length of original database information is longer than a single plaintext domain of the SIMD technique, slicing will be performed to obtain a plurality of query results, by rotating each query result by the corresponding multiples of B, where the SIMD technique supports rotating the encrypted ciphertext by an arbitrary number of slots, the results are added up, the maximum of N/B ciphertexts may be added up together, and final query results will not be affected. The returned communication volume may be reduced by N/B times.

A rotation and merging algorithm proposed in the present disclosure may further compress the size of the ciphertext of the returned result, which is more suitable for a network environment in practice. In an embodiment, for a database with one million pieces ($2^{20}$ pieces) of data (a length of each piece of data is set to be 20 KB), when two thousand queries are completed in batch, equalized time required for each query is 0.27 seconds, which reduces a communication volume in an upload part by about 75 times compared with a previous batch query. A downlink communication volume is the same as other comparable schemes (without rotation, the downlink communication volume in this scenario will be inflated).

(6) The query result ciphertext is decrypted by the client, and thus a query result of the batch query request is obtained simultaneously.

In an embodiment, the ciphertext obtained from a return is decrypted by a private key generated during encryption through a homomorphic encryption principle, and at the same time decoded through a Chinese remainder theorem, at which time the client may obtain queried corresponding information. If the rotation operation is used for recombining the returned results, since the client knows the rotation algorithm of the server, i.e., the server knows the specific position where the corresponding information appears, the required medicine information may be obtained by recombining and arranging.

Corresponding to the foregoing embodiments of the batch private information retrieval method, the present disclosure further provides an embodiment of a batch private information retrieval apparatus.

Figure 6:
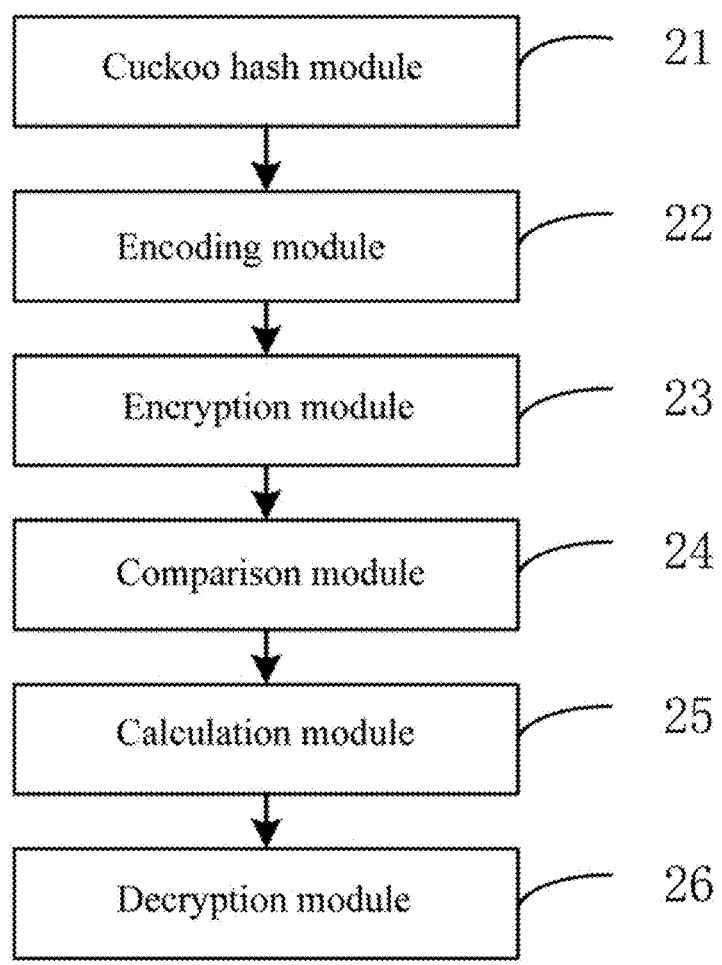
FIG. 6 is a block diagram of a batch private information retrieval apparatus illustrated according to an exemplary embodiment.

FIG. 6 is a block diagram of a batch private information retrieval apparatus illustrated according to an exemplary embodiment. Referring to FIG. 6, the apparatus may include:

A cuckoo hash module 21 configured to agree on a hash function used in a cuckoo hash technique by a client and a server, calculate a serial number index in an original database through the cuckoo hash technique, retain a result of each serial number index for each hash function, and obtain a first hash bucket containing a plurality of baskets, where the result of the serial number index in the first hash bucket is public to both the server and the client.

An encoding module 22 configured to fill an index of a batch query into a second hash bucket of a same length as the first hash bucket through a cuckoo hash algorithm by the client, where a sequence index of the index of the batch query in the corresponding basket of the first hash bucket is filled at a corresponding position, and to encode a filling result by using a constant weight code encoding manner.

An encryption module 23 configured to encrypt an obtained encoding result by using a homomorphic encryption technique for as a batch query request by the client, and send the batch query request to the server.

A comparison module 24 configured to compare the received batch query request with the first hash bucket by using the homomorphic encryption technique by the server to obtain a corresponding intermediate result.

A calculation module 25 configured to calculate correspondingly the intermediate result and the original database by the server to obtain a query result ciphertext corresponding to the batch query request, and send the query result ciphertext to the client.

A decryption module 26 configured to decrypt the query result ciphertext by the client, and thus simultaneously obtain a query result of the batch query request.

As for the apparatus in the above embodiment, a specific mode in which each module performs operations has been described in detail in the embodiments of the method, which will not be described in detail here.

As for the apparatus embodiment, as it basically corresponds to the method embodiments, please refer to the partial description of the method embodiments for related parts. The apparatus embodiment described above is only illustrative. Units described as separate components may or may not be physically separated, and the components displayed as units may or may not be physical units, that is, they may be located in one place, or they may be distributed onto a plurality of network units. Some or all of the modules may be selected according to actual needs to implement the objective of the scheme of the present disclosure. Those of ordinary skill in the art may understand and implement it without creative work.

Figure 7:
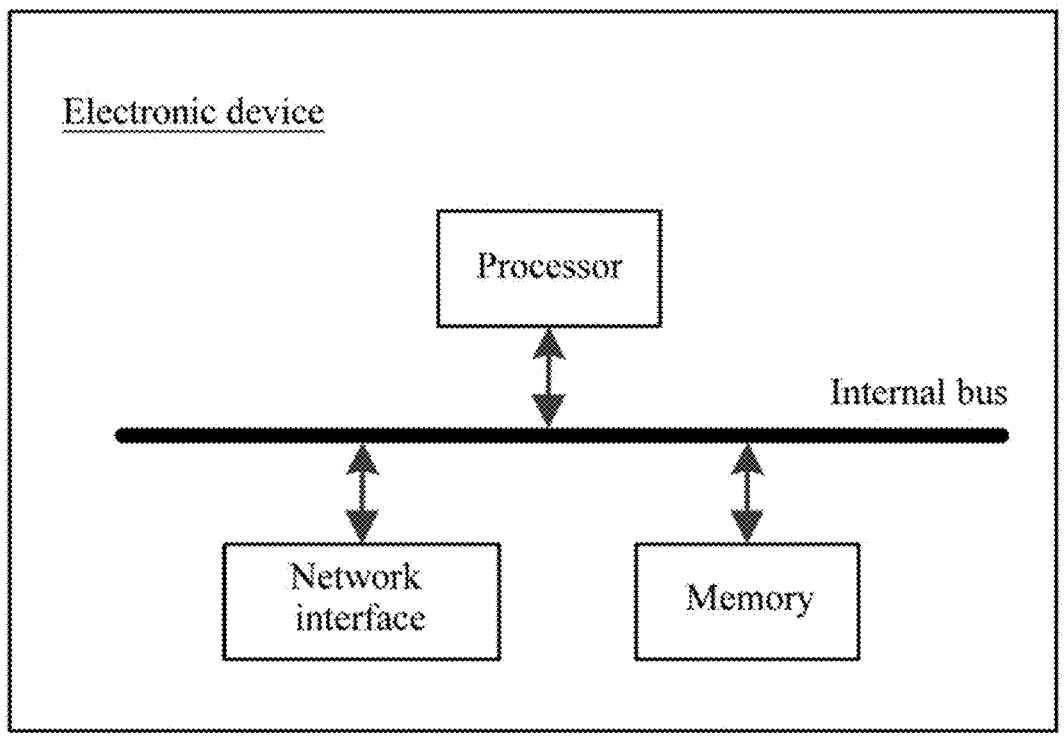
FIG. 7 is a schematic diagram of an electronic device illustrated according to an exemplary embodiment.

Accordingly, the present disclosure further provides an electronic device, including: one or more processors; and a memory, configured to store one or more programs; and when the one or more programs are executed by the one or more processors, the one or more processors implement the batch private information retrieval method as described above. As shown in FIG. 7, it is a hardware structure diagram of any device with a data processing capability where the batch private information retrieval method is located. In addition to a processor, an internal memory and a network interface shown in FIG. 7, any device with the data processing capability where the apparatus in the embodiment is located may further include other hardware according to an actual function of any device with the data processing capability, which will not be repeated.

Accordingly, the present disclosure further provides a computer-readable storage medium, storing a computer instruction thereon, and the instruction, when executed by a processor, implements the batch private information retrieval method as described above. The computer readable storage medium may be an internal storage unit of any device with the data processing capability described in any of the aforementioned embodiments, such as a hard disk or an internal memory. The computer readable storage medium may further be an external storage device, such as a plug-in hard disk, a smart media card (SMC), an SD card, a flash card, etc. arranged on the device. Further, the computer readable storage medium can further include both the internal storage unit of any device with the data processing capability and the external storage device. The computer readable storage medium is used for storing the computer program and other programs and data required by any device with the data processing capability, and may further be used for temporarily storing data that has been outputted or will be outputted.

Other implementation schemes of the present disclosure will be apparent to those skilled in the art from consideration of the specification and practice of the content disclosed herein. The present disclosure is intended to cover any variation, use, or adaptation of the present disclosure that follows the general principles of the present disclosure and includes common knowledge or customary technical means in the technical field that are not disclosed in the present disclosure.

It should be understood that the present disclosure is not limited to the exact construction that has been described above and illustrated in the drawings, and that various modifications and changes may be made without departing from its scope.

What is claimed is:

1. A batch private information retrieval method, comprising:
    Agreeing, by a client and a server, on a hash function used in a cuckoo hash technique, calculating, by the cuckoo hash technique, a serial number index in an original database, retaining a result of each serial number index for each hash function, and obtaining a first hash bucket comprising several baskets, wherein the result of the serial number index in the first hash bucket is public to both the server and the client;
    filling, by the client, an index of a batch query into a second hash bucket of a same length as the first hash bucket through a cuckoo hash algorithm, wherein a sequence index of the index of the batch query in the corresponding basket of the first hash bucket is filled at a corresponding position, and encoding a filling result by using a constant weight code encoding manner;
    encrypting, by the client, an obtained encoding result by using a homomorphic encryption technique as a batch query request, and sending the batch query request to the server;
    comparing, by the server, the received batch query request with the first hash bucket by using the homomorphic encryption technique to obtain a corresponding intermediate result;
    calculating correspondingly, by the server, the intermediate result and the original database to obtain a query result ciphertext corresponding to the batch query request, and sending the query result ciphertext to the client; and
    decrypting, by the client, the query result ciphertext, and thus simultaneously obtaining a query result of the batch query request.

2. The method according to claim 1, wherein said encoding a filling result by using a constant weight code encoding manner comprises: selecting a length n of a largest basket in the first hash bucket as an encoding domain of a constant weight code, wherein a length corresponding to the constant weight code is m, selecting a number k of 1 in the constant weight code, and mapping the filling result into the constant weight code.

3. The method according to claim 1, further comprising: encrypting, by the client, the obtained encoding result by using a Single Instruction Multiple Data SIMD technique of homomorphic encryption.

4. The method according to claim 3, wherein said encrypting, by the client, the obtained encoding result by using a Single Instruction Multiple Data SIMD technique of homomorphic encryption comprises: for a hash bucket of a length B, encrypting B corresponding first bits in the hash bucket into a same ciphertext, encrypting a second bit into a second ciphertext, and so on, wherein when a corresponding position corresponding to the hash bucket is empty, all bits of the constant weight code are 0 by default.

5. The method according to claim 1, wherein said comparing, by the server, the received batch query request with the first hash bucket by using the homomorphic encryption technique to obtain a corresponding intermediate result comprises:
    performing corresponding constant weight code encoding on each sequence index in each basket of the first hash bucket; and selecting, for each sequence index, a ciphertext corresponding to a bit 1 in a current constant weight code, and calculating a product of all selected ciphertexts by using a SIMD technique of homomorphic encryption to obtain the corresponding intermediate result.

6. The method according to claim 1, wherein said calculating correspondingly, by the server, the intermediate result and the original database to obtain a query result ciphertext corresponding to the batch query request comprises:

multiplying the intermediate result by a corresponding position of the original database to obtain a ciphertext in the corresponding position of the original database; and adding all results in each basket to form the query result ciphertext.

7. The method according to claim 6, further comprising: when a length of content at the corresponding position of the original database exceeds a plaintext domain of a SIMD technique, slicing the content and querying the sliced content, respectively, to form several query result ciphertexts, and sending the query result ciphertexts to the client, respectively.

8. An electronic device, comprising:
one or more processors; and
a memory configured to store one or more programs;
wherein the one or more processors, when executed by the one or more processors, is configured to implement the method according to claim 1.

9. A non-transitory computer-readable storage medium on which a computer instruction is stored, wherein the computer instruction, when executed by a processor, is configured to implement steps of the method according to claim 1.

10. A batch private information retrieval apparatus, comprising:

a cuckoo hash module configured to agree on a hash function used in a cuckoo hash technique by a client and a server, calculate a serial number index in an original database by the cuckoo hash technique, retain a result of each serial number index for each hash function, and obtain a first hash bucket comprising several baskets, wherein the result of the serial number index in the first hash bucket is public to both the server and the client;

an encoding module configured to fill an index of a batch query into a second hash bucket of a same length as the first hash bucket through a cuckoo hash algorithm by the client, wherein a sequence index of the index of the batch query in the corresponding basket of the first hash bucket is filled at a corresponding position, and to encode a filling result by using a constant weight code encoding manner;

an encryption module configured to encrypt an obtained encoding result by using a homomorphic encryption technique as a batch query request by the client, and send the batch query request to the server;

a comparison module configured to compare the received batch query request with the first hash bucket by using the homomorphic encryption technique by the server to obtain a corresponding intermediate result;

a calculation module configured to calculate correspondingly the intermediate result and the original database by the server to obtain a query result ciphertext corresponding to the batch query request, and send the query result ciphertext to the client; and a decryption module configured to decrypt the query result ciphertext by the client, and thus simultaneously obtain a query result of the batch query request.

* * * * *